United States Patent
Numata

(10) Patent No.: US 11,815,394 B2
(45) Date of Patent: Nov. 14, 2023

(54) PHOTOELECTRIC CONVERSION DEVICE, METHOD OF CONTROLLING PHOTOELECTRIC CONVERSION DEVICE, AND INFORMATION PROCESSING APPARATUS

(71) Applicant: CANON KABUSHIKI KAISHA, Tokyo (JP)

(72) Inventor: Aihiko Numata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 17/501,808

(22) Filed: Oct. 14, 2021

(65) Prior Publication Data
US 2022/0120610 A1 Apr. 21, 2022

(30) Foreign Application Priority Data

Oct. 20, 2020 (JP) .................................. 2020-175733
Jul. 29, 2021 (JP) .................................. 2021-123980

(51) Int. Cl.
*G01J 1/44* (2006.01)
*H04N 25/702* (2023.01)
*H04N 25/771* (2023.01)

(52) U.S. Cl.
CPC .............. *G01J 1/44* (2013.01); *H04N 25/702* (2023.01); *H04N 25/771* (2023.01); *G01J 2001/442* (2013.01); *G01J 2001/4466* (2013.01)

(58) Field of Classification Search
CPC .................. G01J 1/44; G01J 2001/442; G01J 2001/4466; H04N 5/3696; H04N 5/37452; H04N 5/379; H04N 5/355; H04N 5/37455

(Continued)

(56) References Cited

U.S. PATENT DOCUMENTS 9,210,350 B2 12/2015 Dai
11,366,205 B2 * 6/2022 Ikuta ..................... G01S 7/4861
(Continued)

FOREIGN PATENT DOCUMENTS

WO 2019/060942 A1 4/2019

OTHER PUBLICATIONS

Andrew Berkovich, et al.; " a Scalable 20×20 Fully Asynchronous Spad-Based Imaging Sensor With AER Readout;" Department of Electrical and Computer Science, Institute for Systems Research; IEEE; 2015; pp. 1110-1113.

*Primary Examiner* — Lin Ye
*Assistant Examiner* — Chan T Nguyen
(74) *Attorney, Agent, or Firm* — CANON U.S.A., INC. IP Division

(57) ABSTRACT

A photoelectric conversion device including a pixel configured to output a signal in response to incidence of a photon includes a first measurement unit configured to measure the signal output from the pixel, a second measurement unit configured to measure time until the signal measured by the first measurement unit reaches a first threshold, a first storage unit configured to store, as a first time, a result of the measurement by the second measurement unit at a first time point, a comparison unit configured to compare the first time stored in the first storage unit and a second time measured by the second measurement unit at a second time point later than the first time point, and an output unit configured to output a signal corresponding to a result of the comparison by the comparison unit.

18 Claims, 9 Drawing Sheets

(58) Field of Classification Search
USPC ........................................................ 348/302
See application file for complete search history.

(56) References Cited

U.S. PATENT DOCUMENTS

| | | | |
|---|---|---|---|
| 2019/0187628 A1* | 6/2019 | Chu | H01J 49/0036 |
| 2020/0007798 A1* | 1/2020 | Liu | H04N 25/75 |
| 2020/0036918 A1* | 1/2020 | Ingle | H01L 27/14625 |
| 2020/0109987 A1* | 4/2020 | Willassen | G01S 7/4865 |
| 2022/0155153 A1* | 5/2022 | Zhu | G01J 1/44 |

* cited by examiner

PHOTOELECTRIC CONVERSION DEVICE, METHOD OF CONTROLLING PHOTOELECTRIC CONVERSION DEVICE, AND INFORMATION PROCESSING APPARATUS

BACKGROUND OF THE INVENTION

Field of the Invention

The present invention relates to a photoelectric conversion device.

Description of the Related Art

There has been known a photoelectric conversion device (hereinafter, photon counting sensor) that digitally counts the number of photons arriving at an avalanche photodiode (hereinafter, APD), and outputs the count value as a photoelectrically-converted digital signal from a pixel (see U.S. Pat. No. 9,210,350).

SUMMARY OF THE INVENTION

A photoelectric conversion device including a pixel configured to output a signal in response to incidence of a photon includes a first measurement unit configured to measure the signal output from the pixel, a second measurement unit configured to measure time until the signal measured by the first measurement unit reaches a first threshold, a first storage unit configured to store, as a first time, a result of the measurement by the second measurement unit at a first time point, a comparison unit configured to compare the first time stored in the first storage unit and a second time measured by the second measurement unit at a second time point later than the first time point, and an output unit configured to output a signal corresponding to a result of the comparison by the comparison unit.

Further features of the present invention will become apparent from the following description of embodiments with reference to the attached drawings.

DESCRIPTION OF THE EMBODIMENTS

Figure 1:
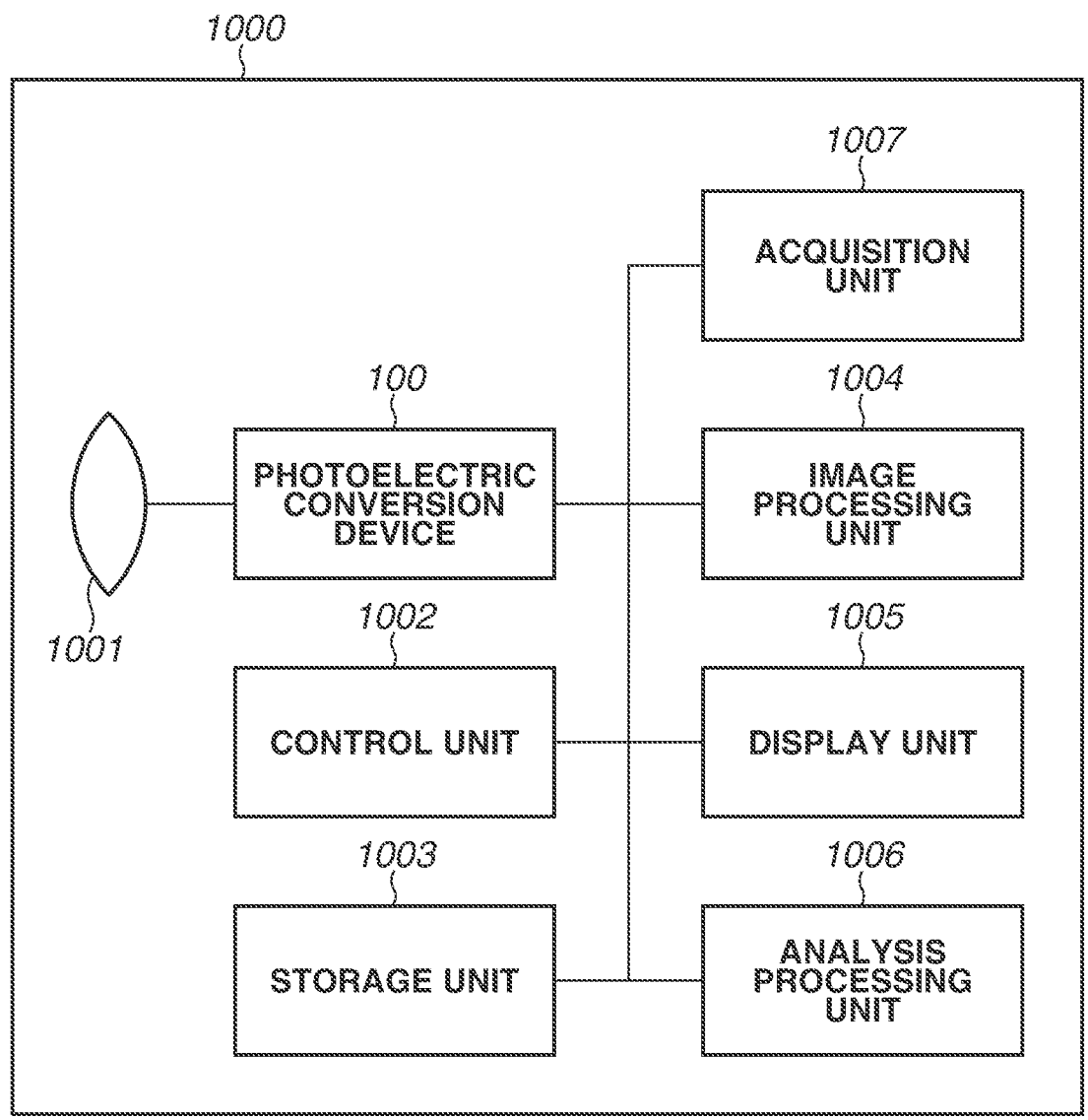
FIG. 1 is a block diagram illustrating a functional configuration example of an information processing apparatus including a photoelectric conversion device.

A photoelectric conversion device according to embodiments of the present invention is described below with reference to drawings. In all of the drawings, components having the same function are denoted by the same reference numerals, and repetitive descriptions of the components are omitted.

Information Processing Apparatus

FIG. 1 illustrates a functional configuration example of an information processing apparatus 1000 including a photoelectric conversion device according to a first embodiment. The information processing apparatus 1000 includes a light receiving lens 1001, a photoelectric conversion device 100, a control unit 1002, a storage unit 1003, an image processing unit 1004, a display unit 1005, an analysis processing unit 1006, and an acquisition unit 1007. The information processing apparatus 1000 is specifically an image capturing apparatus or a measurement apparatus. The light receiving lens 1001 receives incident light, and forms an image on the photoelectric conversion device 100. The photoelectric conversion device 100 outputs a signal corresponding to the received incident light. The detail thereof is described below. The control unit 1002 controls the focusing of the light receiving lens 1001, the driving of a diaphragm, the driving of the photoelectric conversion device 100, and the like. The storage unit 1003 stores, for example, the signal output from the photoelectric conversion device 100, and image data processed by the image processing unit 1004. The storage unit 1003 also stores various kinds of settings relating to the information processing apparatus 1000. The image processing unit 1004 processes image data based on the signal output from the photoelectric conversion device 100. The image processing unit 1004 determines a pixel value of each of pixels of an image based on the signal and a measurement time, thereby generating the image data. The information processing apparatus that converts an address event signal from the photoelectric conversion device 100 into the image data by the image processing unit 1004 and uses the image data is described as an example; however, the information processing apparatus 1000 may not necessarily generate image data. The display unit 1005 displays the image data generated by the image processing unit 1004 and various kinds of information. The functions as the storage unit 1003 and the display unit 1005 may be provided outside the information processing apparatus 1000. Further, as examples of the other functional configurations (not illustrated), the information processing apparatus 1000 may be provided with an operation unit for the user to input various kinds of instructions such as an image capturing instruction, a sound output unit outputting, for example, sound of a moving image as output other than the image display. The analysis processing unit 1006 performs predetermined analysis processing based on the address event signal output from the photoelectric conversion device 100. More specifically, the analysis processing unit 1006 performs object detection, moving object detection, etc. Specific processing is described below. The acquisition unit 1007 acquires the address event signal from the photoelectric conversion device 100.

Figure 2:
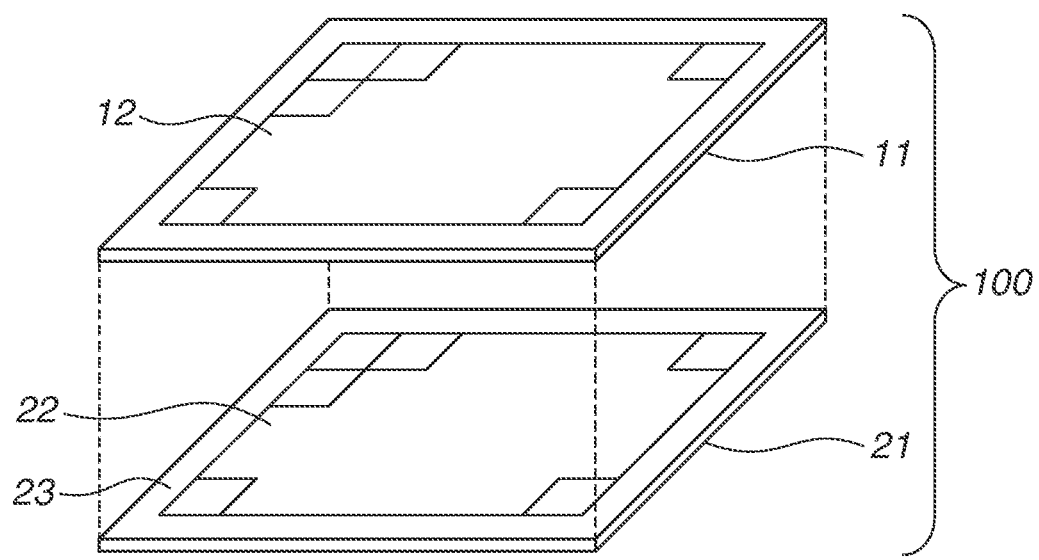
FIG. 2 is a diagram illustrating an example of a stacked-layer structure of a photoelectric conversion device according to a first embodiment.

FIG. 2 is a diagram illustrating a configuration example of the photoelectric conversion device 100 according to the present embodiment. The photoelectric conversion device 100 is composed of two chips, i.e., a sensor chip 11 and a circuit chip 21, that are stacked on and electrically connected to each other. The sensor chip 11 includes a pixel area 12. The circuit chip 21 includes a pixel circuit area 22 processing a signal detected by the pixel area 12, and a readout circuit area 23 reading out the signal from the pixel circuit area 22.

Pixel Substrate

Figure 3:
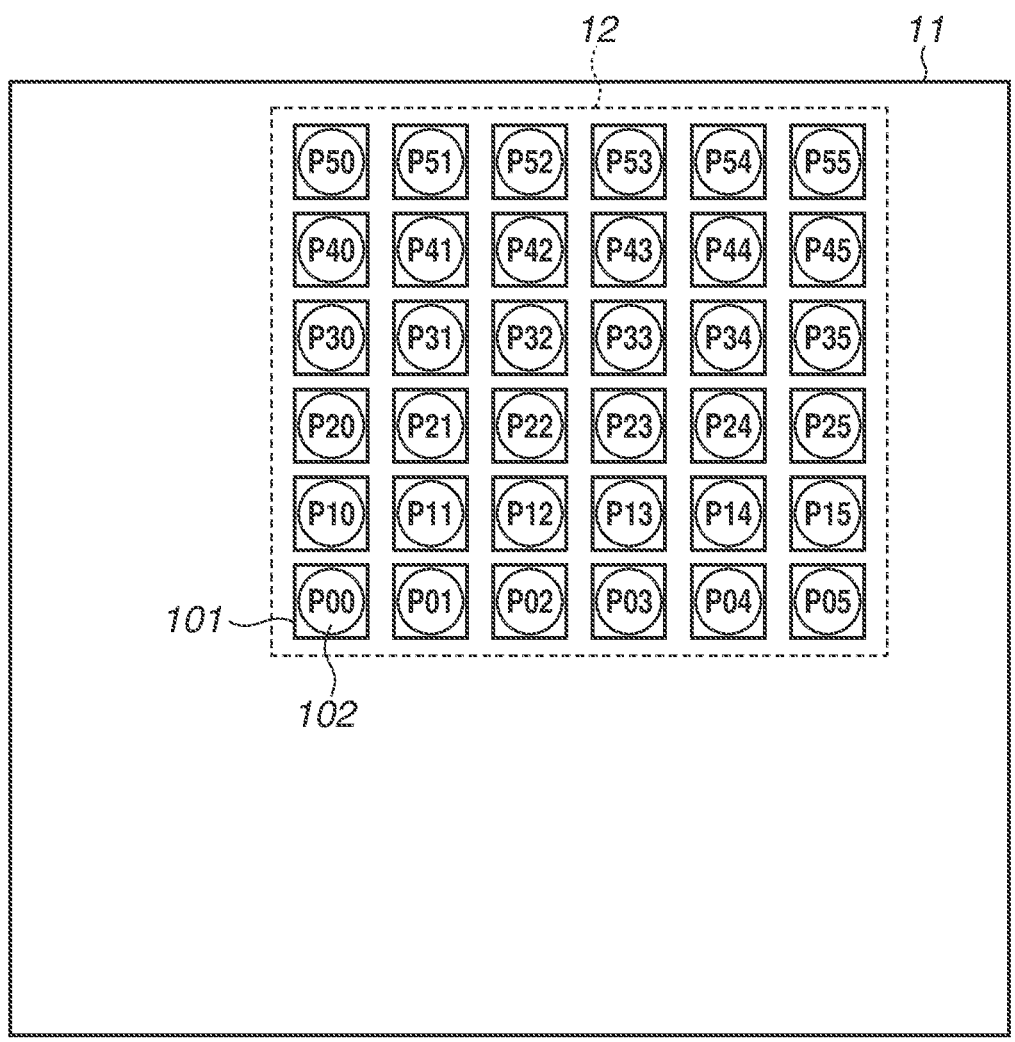
FIG. 3 is a diagram illustrating an example of a sensor chip in the photoelectric conversion device according to the first embodiment.

FIG. 3 is a diagram illustrating a configuration example of the sensor chip 11. The pixel area 12 of the sensor chip 11 includes a plurality of pixels 101 two-dimensionally arranged therein. Each of the pixels 101 is provided with a photoelectric conversion unit 102 including an avalanche photodiode (APD). FIG. 3 illustrates 36 pixels arranged in six rows from the zeroth row to the fifth row and six columns from the zeroth column to the fifth column, with reference symbols each representing a row number and a column number. For example, a unit pixel 101 disposed in a first row and a fourth column is denoted by a reference symbol "P14". The number of rows and the number of columns of a pixel array forming the pixel area 12 are not particularly limited.

Circuit Substrate

Figure 4:
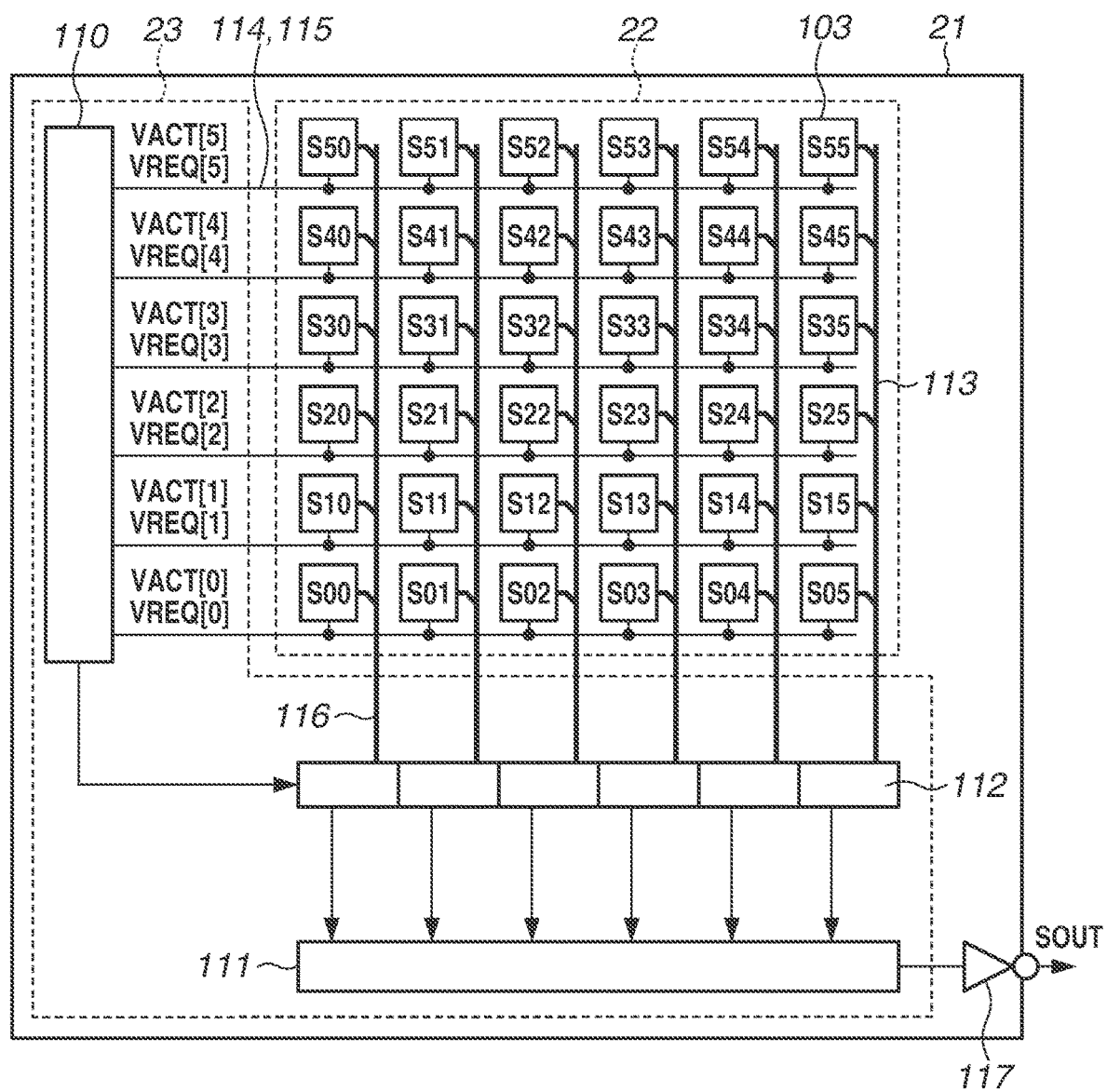
FIG. 4 is a diagram illustrating an example of a circuit chip in the photoelectric conversion device according to the first embodiment.

FIG. 4 is a diagram illustrating a configuration example of the circuit chip 21. The circuit chip 21 includes the pixel circuit area 22 and the readout circuit area 23. The pixel circuit area 22 includes a plurality of signal processing units 103 two-dimensionally arranged corresponding to the pixels 101 of the sensor chip 11. FIG. 4 illustrates 36 signal processing units 103 arranged in six rows from the zeroth row to the fifth row and six columns from the zeroth column to the fifth column, with reference symbols each representing the row number and the column number. For example, the signal processing unit 103 disposed in the first row and the fourth column is denoted by a reference symbol "S14". The number of rows and the number of columns of a signal processing unit array forming the pixel circuit area 22 are not particularly limited. The readout circuit area 23 includes a vertical arbitration circuit 110, column circuits 112, a horizontal readout circuit 111, and a signal output circuit 117.

Vertical Arbitration Circuit

In each of the rows of the signal processing unit array of the pixel circuit area 22, a request signal output line 114VREQ and a response input line 115VACT extend in a first direction that corresponds to the lateral direction in FIG. 4. The request signal output line 114VREQ and the response input line 115VACT are connected to the signal processing units 103 arranged in the first direction, thereby forming a signal line. The first direction in which the request signal output line 114VREQ and the response input line 115VACT extend is also referred to as a row direction or a horizontal direction. In FIG. 4, control lines VREQ and VACT are illustrated with reference symbols each representing the row number. For example, the request signal line in the first row is denoted by a reference symbol "VREQ[1]".

The control lines VREQ and VACT of each of the rows are connected to the vertical arbitration circuit 110. The vertical arbitration circuit 110 supplies control signals to drive the signal processing units 103, to the signal processing units 103 through the request signal output lines 114VREQ and the response input lines 115VACT.

Each of the signal processing units 103 outputs a request signal requesting output of address event data, to the vertical arbitration circuit 110 through the corresponding request signal output line 114VREQ. The vertical arbitration circuit 110 arbitrates the request from each of the signal processing units 103 of the pixels, and returns a response representing permission or prohibition of output of the address event data, to the signal processing unit 103 through the corresponding response input line 115VACT.

Signal Output

In each of the columns of the signal processing unit array of the pixel circuit area 22, a signal line 116 extends in a second direction, i.e., the vertical direction in FIG. 4, intersecting the first direction. The signal line 116 is connected to the signal processing units 103 arranged in the corresponding column in the second direction, thereby forming a common signal line. The second direction in which the signal lines 116 extend is also referred to as a column direction or a vertical direction. In FIG. 4, the signal lines 116 are illustrated with reference symbols each representing the column number.

Each of the signal processing units 103 receives an output permission response from the vertical arbitration circuit 110, and outputs the address event data to the corresponding column circuit 112 through the corresponding signal line 116. The column circuits 112 are provided corresponding to the respective columns of the signal processing unit array of the pixel circuit area 22, and are connected to the signal lines 116 of the respective columns Each of the column circuits 112 has a latch function for holding the signals read out from the signal processing units 103 through the signal line 116 of the corresponding column.

Horizontal Readout

The horizontal readout circuit 111 supplies, to the column circuits 112, control signals to read out the signals from the column circuits 112, and receives the address event data from the column circuits 112 of the respective columns. The signal output circuit 117 outputs the address event data measured by each of the pixels as an output signal SOUT. The address event data includes coordinate information on a unit pixel in which the number of incident photons per unit time is changed as an event and information on a time when the number of incident photons per unit time is changed. In addition, the address event data can include polarity (positive/negative) of change in the number of incident photons per unit time. A method of counting the address event data is described below. In a use case where high-speed processing is required for, for example, control of a robot and a vehicle, using the address event data makes it possible to realize the high-speed processing, which cannot be coped with by an existing synchronous photoelectric conversion device. Advantages of minute luminance change in a single photon avalanche diode (SPAD) are described below.

Pixel Unit

Figure 5:
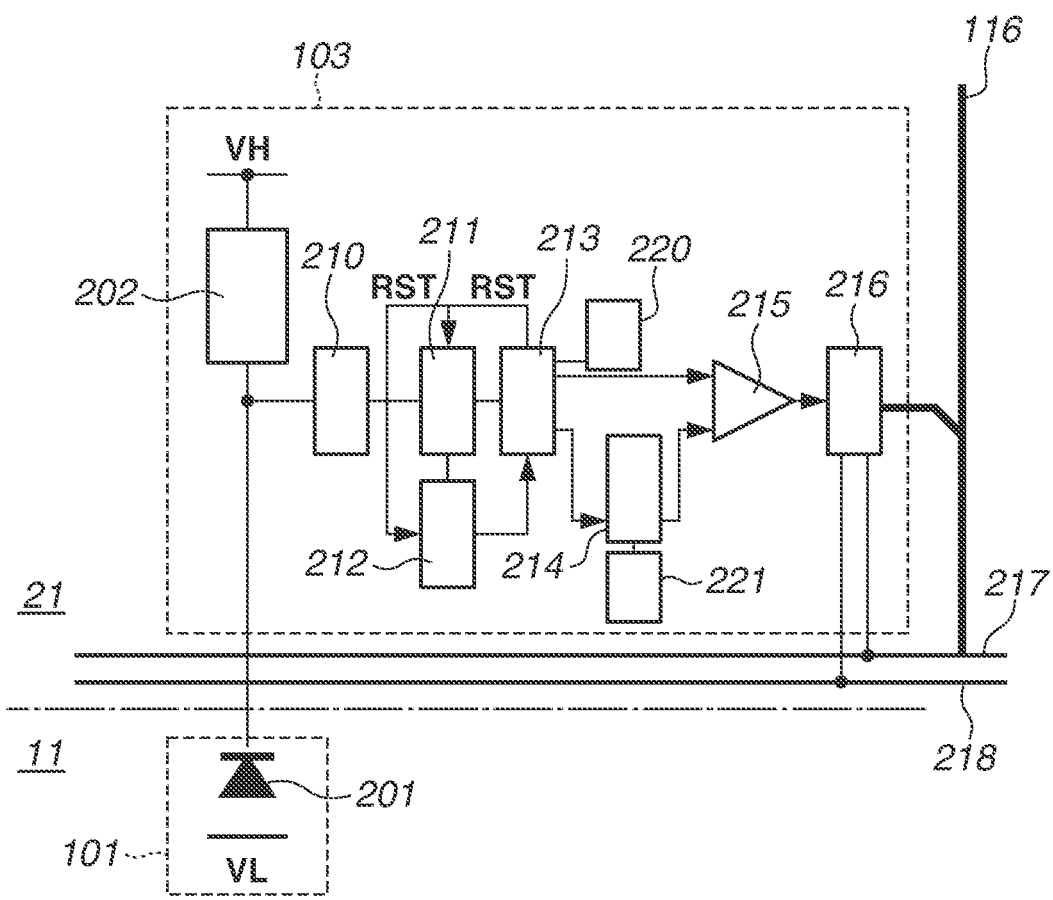
FIG. 5 is a diagram illustrating an example of a pixel according to the first embodiment.

FIG. 5 is an example of an equivalent circuit and a block diagram of one of the pixels 101 in FIG. 3 and a corresponding one of the signal processing units 103 in FIG. 4.

Each of the pixels 101 of the sensor chip 11 includes an APD 201 serving as the photoelectric conversion unit. When light enters the APD 201, a charge pair corresponding to the incident light is generated by photoelectric conversion. A voltage VL (first voltage) is supplied to an anode of the APD 201. A voltage VH (second voltage) that is higher than the voltage VL supplied to the anode is supplied to a cathode of the APD 201. Reverse bias voltages causing the APD 201 to perform an avalanche multiplication operation are supplied to the anode and the cathode. In a state where such voltages are supplied thereto, the charges generated by the incident light cause avalanche multiplication, and an avalanche current is generated.

Each of the signal processing units 103 of the circuit chip 21 includes a quench element 202, a waveform shaping unit 210, a first counter circuit 211, a second counter circuit 212, a first determination circuit 213, a memory 214, a comparator 215, a second determination circuit 216, a response circuit 217, and a selection circuit 218.

The quench element 202 is connected to a power supply supplying the voltage VH and the corresponding APD 201. The quench element 202 has a function to convert the change in the avalanche current generated in the corresponding APD 201 into a voltage signal. The quench element 202 functions as a load circuit (quench circuit) in signal multiplication caused by the avalanche multiplication to suppresses the voltage supplied to the corresponding APD 201 and suppress the avalanche multiplication (quench operation).

The waveform shaping unit 210 shapes potential change in the cathode of the corresponding APD 201 obtained when a photon is detected, thereby outputting a pulse signal. As the waveform shaping unit 210, for example, an inverter circuit or a buffer circuit is used.

Pixel Counter Unit

The first counter circuit 211 counts the pulse signal (output signal from each pixel) output from the waveform shaping unit 210. In other words, the first counter circuit 211 counts the number of photons entering the corresponding APD 201. Further, the first counter circuit 211 resets a count value in response to a reset signal from the first determination circuit 213.

Meanwhile, the second counter circuit 212 counts a time in which the first counter circuit 211 counts the photons, by using a clock supplied from outside of the sensor (or clock generated in the sensor by using the supplied clock). In other words, the second counter circuit 212 is a time-to-digital converter (TDC). The second counter circuit may output the time (seconds) or the number of clocks.

In a case where the number of photons counted by the first counter circuit 211 reaches a first threshold, the first determination circuit 213 resets the count value of the first counter circuit 211. Furthermore, after comparison by the comparator 215 described below ends, the first determination circuit 213 overwrites the memory 214 with the count value (second time count value) output by the second counter circuit 212, and resets the count value of the second counter circuit 212. In other words, the first determination circuit 213 has a function to reset the first counter circuit 211 counting the number of photons and the second counter circuit counting the incident time of the photons, each time the number of photons entering the corresponding APD 201 reaches the first threshold.

The memory 214 stores a past count value (first time count value) of the second counter circuit 212, and the count value in the memory 214 is overwritten each time the count value of the second counter circuit 212 is reset. The comparator 215 obtains a count value difference 219 between the current count value (second time count value) of the second counter circuit 212 and the past count value (first time count value) of the second counter circuit 212. In other words, the comparator 215 outputs a predetermined signal (e.g., count value difference) based on a result of the comparison between a first time required for the number of photons counted by the first counter circuit to exceed a threshold for an N-th time and a second time required for the number of photons to similarly exceed the threshold for an N+1-th time. Alternatively the comparator 215 may detect luminance change by using a ratio of the count value of the first counter circuit 211 to the count value of the second counter circuit 212.

Cooperation with Peripheral Circuits

In a case where the count value difference is greater than or equal to a second threshold, the second determination circuit 216 transmits a request signal to the vertical arbitration circuit 110 through the corresponding request signal output line 114VREQ. The response circuit 217 receives a response representing permission or prohibition of output of the address event data from the vertical arbitration circuit 110 through the corresponding response input line 115VACT. In contrast, in a case where the count value difference is less than the second threshold, the second determination circuit 216 does not transmit the request signal.

When the response circuit 217 receives a response representing permission of output, the selection circuit 218 switches the connection of the memory 214 and the corresponding signal line 116 by a control signal VSEL. As a result, the count value (second time count value) of the second counter circuit 212 held by the memory 214 is output to the corresponding column circuit 112.

Summary

The count value difference calculated by the comparator 215 represents an interval of times when the count value of the second counter circuit 212 is reset. As described above, since the count value of the second counter circuit 212 is reset when the number of photons entering the corresponding APD 201 reaches the first threshold, the count value difference represents an interval of times when the number of incident photons reaches the first threshold. In other words, the count value difference 219 corresponds to a reciprocal of the frequency of incidence of photons. Accordingly, the photoelectric conversion device 100 has a function to measure "a change in the frequency of incidence of photons", i.e., a change in luminance.

Further, only in a case where the interval of times when the number of incident photons reaches the first threshold is greater than or equal to the second threshold, the address event data is output through the second determination circuit 216. In other words, in a case where the change in incidence frequency is large, the photoelectric conversion device 100 outputs the incidence frequency. In a case where the change in incidence frequency is small, the photoelectric conversion device 100 does not output the incidence frequency. The above-described configuration makes it possible to realize a nonsynchronous photoelectric conversion device that detects a change in luminance as an address event for each pixel address in real time. As described above, Dynamic Visio n Sensor (DVS) is realized by a photon count type photoelectric conversion device, which makes it possible to detect change at a level of one photon as the address event and to finely set a detection condition of the address event.

Timing Chart

Figure 6:
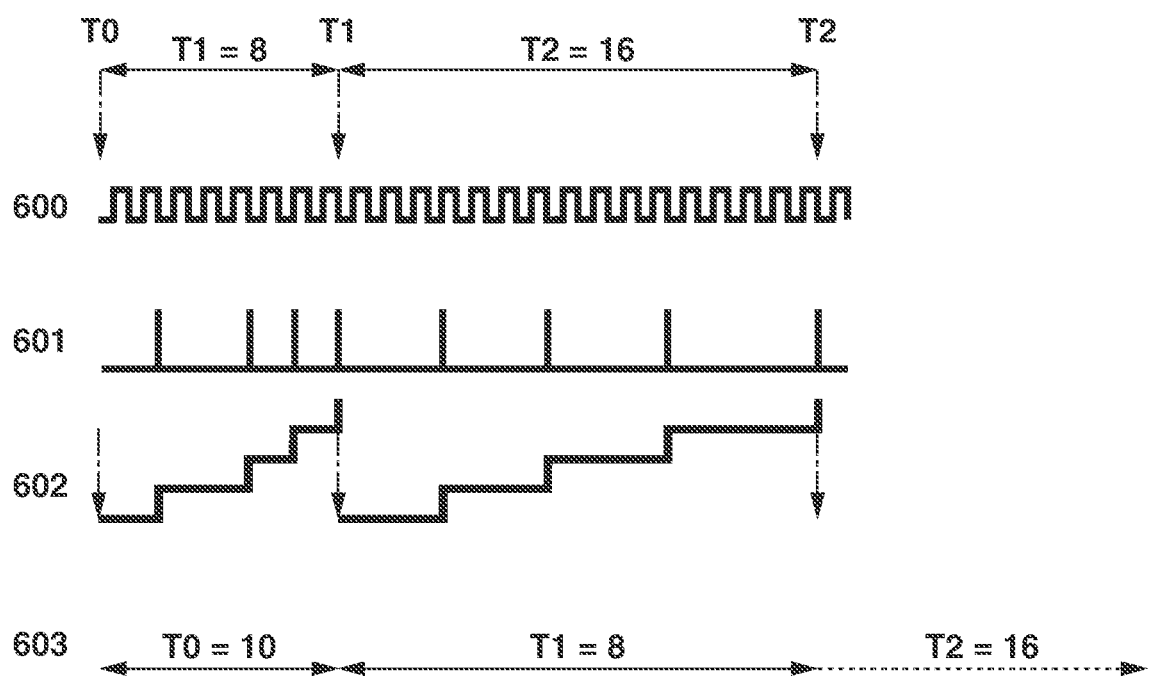
FIG. 6 is a timing chart illustrating a photoelectric conversion device driving method according to the first embodiment.

FIG. 6 is a timing chart illustrating a driving method to detect the address event by using the photoelectric conversion device 100. FIG. 6 illustrates a case where each of the first threshold and the second threshold is set to four counts. FIG. 6 illustrates a clock 600, a timing 601 when the photon is detected by the first counter circuit 211, the count value 602 of the first counter circuit 211, and the count value 603 of the second counter circuit 212 stored in the memory 214.

At a first time point T0, the first counter circuit 211 starts counting of the photons. At this time, the memory 214 stores the first time count value counted by the second counter circuit 212 at a previous timing. In FIG. 6, a first time count value T0=10 is stored as an initial time count value.

After the first counter circuit 211 starts counting of the photons, the count value of the first counter circuit 211 reaches the first threshold of 4 at a second time point T1. The count value at the second time point T1 is counted by the second counter circuit 212. In FIG. 6, a case where the time count value at the second time point T1 counted by the second counter circuit is T1=8 is illustrated. The first determination circuit 213 determines that the count value of the first counter circuit 211 reaches the first threshold of 4, and resets the count value of the first counter circuit 211.

At the same time, the comparator 215 obtains ΔT1=2 as a count value difference ΔT1 between the time count value at the time point T1 and the time count value at the time point T0. The second determination circuit 216 compares the count value difference ΔT1=2 with the second threshold of 4. At the time point T1, the count value difference ΔT1 is less than the second threshold, so that the time count value is not output. After the determination by the comparator 215 is completed, the time count value at the time point T1 counted by the second counter circuit 212 is written in the memory 214, and the count value of the second counter circuit 212 is reset.

Subsequently, counting of the photons is resumed at the time point T1. After counting of the photons is started, the count value of the first counter circuit 211 reaches the first threshold of 4 again at a time point T2. In FIG. 6, a case where a time count value at the time point T2 is T2=16 is illustrated. As with the time point T1, the first determination circuit 213 resets the count value of the first counter circuit 211, and the comparator 215 obtains ΔT2=6 as a count value difference ΔT2 between the time count value at the time point T2 and the time count value at the time point T1. Since the count value difference ΔT2 is greater than or equal to the second threshold at the time point T2, a request signal to output the time count value at the time point T2 is transmitted to the vertical arbitration circuit 110. In response to the response signal from the vertical arbitration circuit 110, the time count value at the time point T2 of the second counter circuit 212 is output to the corresponding column circuit 112.

Advantages of Photon Count Type

An existing photoelectric conversion device detects, as the change in luminance, change of a quantity of light entering the photodiode in form of an analog signal, and thus it is difficult to measure the change in luminance at one photon level. In contrast, the photoelectric conversion device according to the present embodiment measures the change in luminance by using the first counter circuit 211 counting the number of photons and the second counter circuit 212 counting the time. It is thus possible to detect the change in luminance at one photon level. More specifically, by setting the first threshold to 1, it is possible to detect the change in luminance at one photon level. Detecting the change in luminance at one photon level makes it possible to acquire an address event signal in a dark state, e.g., at night.

Furthermore, the photoelectric conversion device according to the present embodiment determines presence/absence of change in the luminance by using the comparator 215 and the second determination circuit 216. The address event detection condition can be set in form of a digital signal as the second threshold. Therefore, in the photoelectric conversion device according to the present embodiment, the address event detection condition can be finely set. The address event detection condition is finely set, which makes it possible to remove the luminance change by photon shot noise depending on a scene and to acquire only necessary address event information. More specifically, to acquire only a large luminance change, the threshold is set to a large value. To acquire a small luminance change, the threshold is set to a small value.

Variation: Photon Count

FIG. 5 illustrates the case where the APD is used as the photoelectric conversion unit for realizing the photon count; however, a photoelectric conversion unit of another type may be used. For example, as with a quanta image sensor (QIS) discussed in Jiaju Ma, et. al, "Photon-number-resolving megapixel image sensor at room temperature without avalanche gain", Optica, 2017, the photon count may be realized by using a photoelectric conversion unit, readout noise of which is suppressed to about 0.5 electron or less. However, the readout noise is smaller when the APD is used as illustrated in FIG. 5.

<Variation: First Threshold>

It is preferable that the first threshold be set to a value equal to the number of saturation bits of the first counter circuit 211. More specifically, when the most significant bit of the first counter circuit 211 becomes 1, the count value of the first counter circuit 211 and the count value of the second counter circuit are reset.

The small first threshold is preferable because a frequency of determining presence/absence of change in the count value difference is high and the change in luminance can be instantaneously acquired. On the other hand, the large first threshold is preferable because the frequency of incidence of photons is estimated with a large number of photons, which increases estimation accuracy and enables accurate measurement of the change in luminance. Accordingly, it is more preferable that the first threshold be appropriately changeable based on a use case, an object, or the like.

The DVS mainly has two advantages. One of the advantages is that the DVS can capture a high-speed phenomenon, e.g., an object mounted on a vehicle, and the other advantage is that the DVS can reduce a data amount by not outputting data in a case where the luminance is not changed, for example, in a case of performing fixed-point monitoring in a parking lot or the like. To capture the high-speed phenomenon as in the former case, it is preferable that the first threshold be set to a small value to instantaneously capture the luminance change. On the other hand, to suppress output when the luminance is not changed as in the latter case, it is preferable that the first threshold be set to a large value and the luminance change be accurately measured to reliably suppress the output when the luminance is not changed.

Variation: Second Threshold

The second threshold for determining whether to output the count value difference may be a fixed value or may be changeable with time. The count value difference corresponds to the reciprocal of the frequency of incidence of photons, so that it is preferable that the second threshold be changed based on the count value difference. More specifically, it is preferable that the second threshold be changed so as to be inversely proportional to the count value difference each time the count value of the first counter circuit 211 and the count value of the second counter circuit 212 are reset. Such a configuration makes it possible to determine the second threshold such that a ratio of luminance change ΔL to original luminance L (ΔL/L) is constant. Furthermore, it is more preferable that the second threshold be changeable for each pixel. Since the frequency of incidence of photons is different for each pixel, to keep the ratio ΔL/L constant, it is necessary to make the second threshold changeable for each pixel.

The second threshold may have different values for a case where the count value difference is increased and for a case where the count value difference is reduced. The second threshold has different values between the cases, which makes it possible to selectively detect only increase in luminance or to selectively detect only reduction in luminance.

Variation: Pixel Value is Output when Photons are not Counted

In a case where the frequency of incidence of photons is extremely small, the time until the count value of the first counter circuit 211 reaches the first threshold may become long, and a detection frequency of address event may be reduced. Therefore, in a case where the count value of the first counter circuit 211 does not reach the first threshold even after the count value of the second counter circuit 212 reaches a third threshold, the count value of the first counter circuit 211 at this time is preferably output. More specifically, a third determination circuit is provided to determine, when the count value of the second counter circuit 212 reaches the third threshold, whether the count value of the first counter circuit 211 is greater than or equal to the first threshold or is less than the first threshold. Furthermore, the third determination circuit is connected to the request signal lines, the response input lines, the selection circuit, and the column circuits. Even in the case where the frequency of incidence of photons is small, such a configuration enables detection of presence/absence of an address event.

Variation: Peripheral Circuits

FIG. 4 illustrates the case where the address event of each of the pixels is read out by using the vertical arbitration circuit 110 and the horizontal readout circuit 111; however, the other configurations may be adopted. More specifically, a memory chip 31 is further added to the photoelectric conversion device 100 besides the sensor chip 11 and the circuit chip 21 to realize a three-layer structure. The time count value counted in each of the pixels may be transferred to the memory chip 31 for each of the pixels and temporarily stored in a memory of the memory chip 31, and then the time count values may be sequentially output from the memory chip 31.

Variation: Analysis Processing Using Address Event Signal

Figure 8:
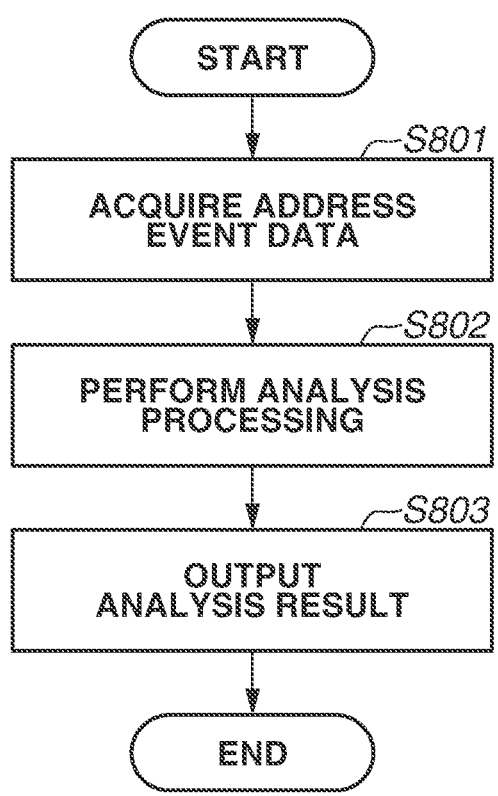
FIG. 8 is a flowchart illustrating processing performed by the information processing apparatus.
Figure 9:
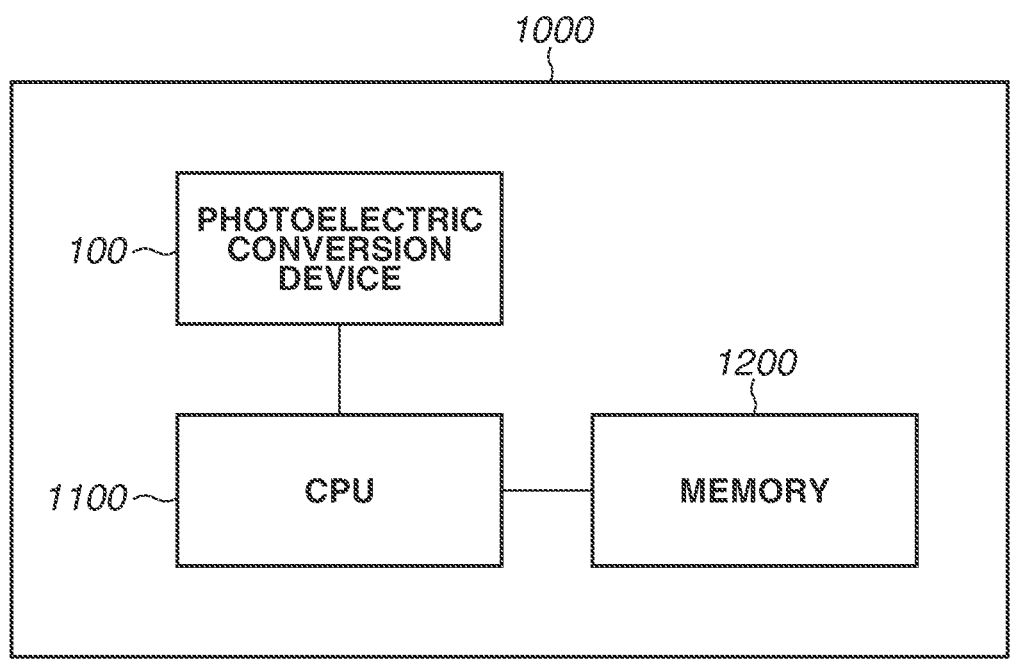
FIG. 9 is a block diagram illustrating an example of a hardware configuration of the information processing apparatus.

An information processing apparatus that performs various kinds of analysis processing based on the address event signal output from the above-described photoelectric conversion device 100 is described. FIG. 9 is a block diagram illustrating a hardware configuration example of an information processing apparatus 1000 according to the present variation. A central processing unit (CPU) 1100 reads out and executes an operating system (OS) and other programs stored in a memory 1200, and controls connected components, thereby performing calculation and logical determination in various kinds of processing. The processing performed by the CPU 1100 includes the information processing according to the embodiment. The memory 1200 is a hard disk drive, an external storage device, or the like, and stores programs and various kinds of data relating to the information processing according to the present embodiment. FIG. 8 is a flowchart illustrating processing performed by the information processing apparatus 1000 that acquires the address event signal output from the photoelectric conversion device 100 described in the present embodiment, and performs various kinds of analysis processing. The processing illustrated in the flowchart of FIG. 8 is performed by the CPU 1100 of FIG. 9 serving as a computer, based on computer programs stored in the memory 1200. In step S801, the acquisition unit 1007 acquires the address event signal detected by the photoelectric conversion device 100. In step S802, the analysis processing unit 1006 performs predetermined analysis processing based on the acquired address event signal. The analysis processing is various kinds of analysis processing such as moving object detection and vibration detection. In step S803, the analysis processing unit 1006 outputs a result of the analysis of the address event signal. For example, in the case of the moving object detection, the analysis processing unit 1006 generates image data representing a time and a place where the moving object is detected, and outputs the image data to the display unit 1005.

Furthermore, the information processing apparatus 1000 may be provided with a trained neural network that receives the address event signal as input and outputs a control signal to learn data used for post-processing from the address event signal. For example, the analysis processing, such as object detection and object classification, may be performed by using the address event signal as a recognition signal for machine learning. Furthermore, a motion vector of the object calculated from the address event signal may be output to the control unit 1002, and may be used for vibration control, tracking, motion estimation, motion analysis, etc. of the object. Furthermore, a frequency of a blinking light source may be used for position estimation or failure analysis of a vibrating object by analyzing the frequency of the blinking light source based on temporal change of the address event.

Variation: Luminance Output

In the present embodiment described above, in the case where the second determination circuit 216 determines that the interval of times when the number of incident photons reaches the first threshold is greater than or equal to the second threshold, the count value of the second counter circuit 212 is output. In addition to the count value of the second counter circuit 212, however, brightness information on the object is preferably output.

More specifically, a first memory unit 220 and a second memory unit 221 are provided. The count value of the second counter circuit 212 is once reset in a case where the interval of times when the number of incident photons reaches the first threshold is greater than or equal to the second threshold. The first memory unit 220 stores the count value of the second counter circuit 212 thereafter until the interval of times when the number of incident photons reaches the first threshold becomes greater than or equal to the second threshold again. The second memory unit 221 stores the number of times of resetting the count value of the first counter circuit 211.

For example, the luminance L of the object can be expressed as follows:

$$L = K(C \times N/T),$$

where C is the number of times of resetting the count value of the first counter circuit 211, T is the count value of the second counter circuit 212, and N is the first threshold.

In the expression, K is an optional coefficient.

This makes it possible to acquire a pixel value with change in light intensity as a trigger. As a result, it is possible to acquire, for example, an image with less influence of camera shake and an image at a moment when the object starts to move.

Figure 7:
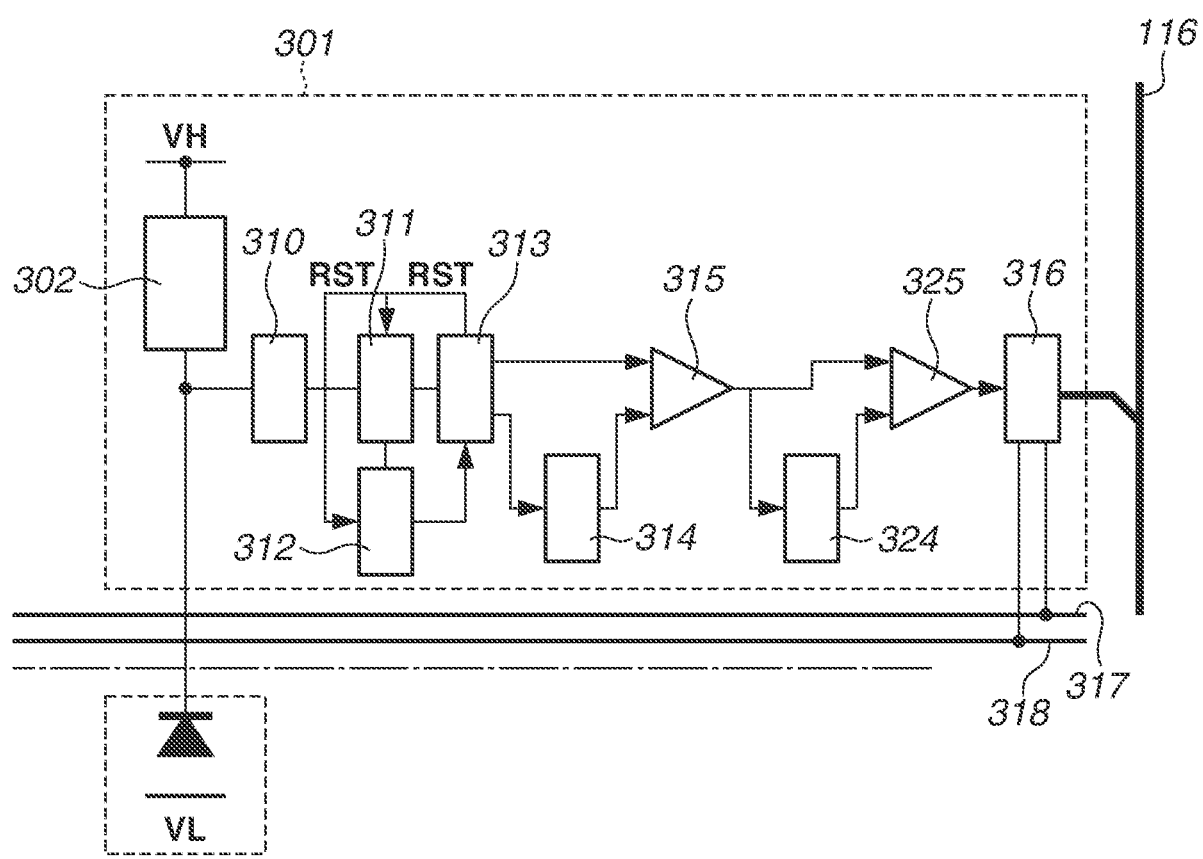
FIG. 7 is a diagram illustrating an example of a pixel according to a second embodiment.

A second embodiment is described below. A photoelectric conversion device 300 according to the second embodiment is different only in configuration of the signal processing unit from the photoelectric conversion device 100 according to the first embodiment. FIG. 7 is an example of an equivalent circuit and a block diagram of one of pixels of the photoelectric conversion device 300 and a corresponding signal processing unit 301. The configuration of the pixel unit is the same as the configuration of the pixel unit of the photoelectric conversion device 100 illustrated in FIG. 5. The description of the configuration of the pixel unit is thus omitted.

As with the signal processing unit 103 illustrated in FIG. 5, the signal processing unit 301 includes a quench element 302, a waveform shaping unit 310, a first counter circuit 311, a second counter circuit 312, a first determination circuit 313, a second determination circuit 316, a response circuit 317, and a selection circuit 318. The signal processing unit 301 further includes a first memory 314, a first comparator 315, a second memory 324 and a second comparator 325. With such a configuration, a "degree of change in brightness" can be detected as an address event. The "change in brightness" is the first derivative of the luminance. Therefore, the "degree of change in brightness" corresponds to the second derivative of the luminance. The second derivative of the luminance is used as the address event, which makes it possible to detect only an abnormal phenomenon, for example, abnormality of an object, the brightness of which is uniformly changed.

The roles and the configurations of the quench element 302, the waveform shaping unit 310, the first counter circuit 311, and the second counter circuit 312 are similar to the roles and the configurations of the quench element 202, the waveform shaping unit 210, the first counter circuit 211, and the second counter circuit 212 illustrated in FIG. 5. The descriptions of the units are thus omitted.

In a case where the number of photons counted by the first counter circuit 311 reaches the first threshold, the first determination circuit 313 resets a count value of the first counter circuit 311. After comparison by the first comparator 315 described below ends, the first determination circuit 313 overwrites the first memory 314 with a count value (second time count value) by the second counter circuit 312, and also resets the count value of the second counter circuit 312.

The first memory 314 stores a past count value (first time count value) of the second counter circuit 312, and the count value in the first memory 314 is overwritten each time the count value of the second counter circuit 312 is reset. The first comparator 315 determines a count value difference between the current count value (second time count value) of the second counter circuit 312 and the past count value (first time count value) of the second counter circuit 312.

The second memory 324 stores a past count value difference (first count value difference), and the count value in the second memory 324 is overwritten each time the count value of the second counter circuit 312 is reset. The second comparator 325 determines a count value difference between the current count value difference (second count value difference) and the past count value difference (first count value difference).

In a case where the count value difference is greater than or equal to a fourth threshold, the second determination circuit 316 transmits a request signal to the vertical arbitration circuit through the corresponding request signal output line. Furthermore, the response circuit 317 receives a response representing permission or prohibition of output of the address event data from the vertical arbitration circuit through the corresponding response input line.

When the response circuit 317 receives the response representing permission of output of the address even data, the selection circuit 318 switches connection of the second memory 324 and the corresponding signal line. As a result, the count value difference stored in the second memory 324 is output to the corresponding column circuit.

Summary

The count value difference represents an interval of times when the count value of the second counter circuit 312 is reset. The count value difference thus corresponds to a degree of change in the frequency of photon incidence. The photoelectric conversion device 100 according to the embodiment of the present invention therefore calculates the second derivative of the luminance. The above-described configuration can realize a nonsynchronous photoelectric conversion device that detects the second derivative of luminance as an address event for each pixel address in real time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Applications No. 2020-175733, filed Oct. 20, 2020, and No. 2021-123980, filed Jul. 29, 2021, which are hereby incorporated by reference herein in their entirety.

What is claimed is:

1. A photoelectric conversion device including a pixel configured to output a signal in response to incidence of a photon, the photoelectric conversion device comprising:
   at least one processor; and
   a memory coupled to the at least one processor, the memory having instructions that, when executed by the processor, performs operations as:
   a first measurement unit configured to measure the signal output from the pixel;
   a second measurement unit configured to measure time until the signal measured by the first measurement unit reaches a first threshold;

a first storage unit configured to store, as a first time, a result of the measurement by the second measurement unit at a first time point;

a comparison unit configured to compare the first time stored in the first storage unit and a second time measured by the second measurement unit at a second time point later than the first time point; and an output unit configured to output a signal corresponding to a result of the comparison by the comparison unit, wherein the output unit is configured to output the signal in a case where a difference between the first time and the second time is greater than a second threshold, and wherein the output unit is configured to output the second time in a case where the difference between the first time and the second time is greater than or equal to the second threshold, and the output unit does not output the second time in a case where the difference is less than the second threshold.

2. The photoelectric conversion device according to claim 1, wherein the second threshold is changeable.

3. The photoelectric conversion device according to claim 1, wherein the second threshold is changeable for each pixel.

4. The photoelectric conversion device according to claim 1, wherein the second threshold is different between a case where the second time is greater than the first time and a case where the second time is less than the first time.

5. The photoelectric conversion device according to claim 1, wherein the first measurement unit is configured to measure a number of photons output from the pixel.

6. The photoelectric conversion device according to claim 1, wherein the instructions further cause the at least one processor to function as:

a conversion unit including an avalanche photodiode.

7. The photoelectric conversion device according to claim 1, wherein the first threshold is equal to a number of saturation bits of the first measurement unit.

8. The photoelectric conversion device according to claim 1, wherein the first threshold is changeable.

9. The photoelectric conversion device according to claim 1, wherein the comparison unit is configured to output a result of the measurement by the first measurement unit in a case where the result of the measurement by the first measurement unit does not reach the first threshold even if a result of the measurement by the second measurement unit reaches the third threshold.

10. The photoelectric conversion device according to claim 1, wherein the instructions further cause the at least one processor to function as:

a second storage unit configured to store a difference between the second time and the first time based on the result of the comparison by the comparison unit.

11. The photoelectric conversion device according to claim 10, wherein the comparison unit is configured to further compare the time difference stored in the second storage unit with a difference between the result of the measurement by the second measurement unit and the time stored in the first storage unit.

12. The photoelectric conversion device according to claim 1, wherein the instructions further cause the at least one processor to function as:

comprising a determination unit configured to reset the measurement by the first measurement unit when a measurement result of the signal by the first measurement unit exceeds the first threshold.

13. The photoelectric conversion device according to claim 12, wherein the determination unit is configured to output the measurement result of the first time by the second measurement unit to the first storage unit, and reset the measurement result of the first time by the second measurement unit, in a case where the result of the measurement by the first measurement unit satisfies the first threshold.

14. The photoelectric conversion device according to claim 12, wherein the determination unit is configured to output luminance of an object based on a number of reset times of the measurement by the first measurement unit.

15. The photoelectric conversion device according to claim 1, wherein the second measurement unit measures time until the signal measured by the first measurement unit reaches the first threshold, by measuring a number of clocks.

16. An information processing apparatus including the photoelectric conversion device according to claim 1, the information processing apparatus comprising:

at least one processor; and a memory coupled to the at least one processor, the memory having instructions that, when executed by the processor, performs operations as:

an acquisition unit configured to acquire the signal output from the photoelectric conversion device; and an analysis unit configured to perform predetermined analysis processing based on the acquired signal.

17. A method of controlling a photoelectric conversion device including a pixel outputting a signal in response to incidence of a photon, the method comprising:

measuring the signal output from the pixel;

measuring time until the measured signal reaches a first threshold;

storing the measured time at a first time point as a first time;

comparing the stored first time and a second time measured at a second time point later than the first time point; and outputting a signal corresponding to a result of the comparison in a case where a difference between the first time and the second time is greater than a second threshold; and outputting the second time in a case where the difference between the first time and the second time is greater than or equal to the second threshold, and not outputting the second time in a case where the difference is less than the second threshold.

18. A non-transitory computer-readable storage medium that stores a program for causing a computer to perform a method according to claim 17.

* * * * *